(12) United States Patent
Sam et al.

(10) Patent No.: US 11,111,399 B2
(45) Date of Patent: Sep. 7, 2021

(54) MATERIALS AND METHODS FOR CONDUCTIVE THIN FILMS

(71) Applicant: Quirklogic, Inc., Calgary (CA)

(72) Inventors: Mahshid Sam, Victoria (CA); Rustom B. Bhiladvala, Victoria (CA)

(73) Assignee: Quirklogic, Inc., Calgary (CA)

( * ) Notice: Subject to any disclaimer, the term of this patent is extended or adjusted under 35 U.S.C. 154(b) by 271 days.

(21) Appl. No.: 15/846,493

(22) Filed: Dec. 19, 2017

(65) Prior Publication Data

US 2018/0118960 A1 May 3, 2018

Related U.S. Application Data

(63) Continuation-in-part of application No. 15/789,877, filed on Oct. 20, 2017.
(Continued)

(51) Int. Cl.
| | |
|---|---|
| *C09D 7/00* | (2018.01) |
| *C09D 7/40* | (2018.01) |
| *C09D 5/24* | (2006.01) |
| *C09D 101/12* | (2006.01) |
| *C09D 101/28* | (2006.01) |
| *C09D 123/02* | (2006.01) |
| *C09D 133/02* | (2006.01) |
| *C08L 1/28* | (2006.01) |

(Continued)

(52) U.S. Cl.
CPC ............ *C09D 7/70* (2018.01); *C08L 1/12* (2013.01); *C08L 1/284* (2013.01); *C09D 5/24* (2013.01); *C09D 101/12* (2013.01); *C09D 101/28* (2013.01); *C09D 123/02* (2013.01); *C09D 133/02* (2013.01); *C08K 7/06* (2013.01); *C08K 9/02* (2013.01); *C08K 2003/0806* (2013.01); *C08K 2003/0831* (2013.01); *C08K 2201/001* (2013.01); *C08K 2201/003* (2013.01); *C08K 2201/011* (2013.01)

(58) Field of Classification Search
CPC ...................................................... C09D 7/70
See application file for complete search history.

(56) References Cited

U.S. PATENT DOCUMENTS

| | | | |
|---|---|---|---|
| 2002/0130311 | A1 | 9/2002 | Lieber et al. |
| 2008/0224123 | A1 | 9/2008 | Martin et al. |

(Continued)

FOREIGN PATENT DOCUMENTS

WO    2015/193645 A1    12/2015

OTHER PUBLICATIONS

Maéva Collet et al.; "Large-Scale Assembly of Single Nanowires through Capillary-Assisted Dielectrophoresis"; Advanced Materials; vol. 27; pp. 1268-1273; 2015 (6 pages).

(Continued)

*Primary Examiner* — Austin Murata
(74) *Attorney, Agent, or Firm* — Chamberlain, Hrdlicka, White, Williams & Aughtry

(57) ABSTRACT

A material composition for manufacturing a translucent conductive film includes a fluid. The material composition further includes nanostructures disposed within the fluid. The material composition further includes a component that modifies a structure of a joint formed between at least two nanostructures of the plurality of nanostructures after the component is activated. The component may be activated by applying heath or optical radiation to the component.

19 Claims, 9 Drawing Sheets

Related U.S. Application Data

(60) Provisional application No. 62/411,354, filed on Oct. 21, 2016.

(51) Int. Cl.
```
C08L 1/12    (2006.01)
C08K 7/06    (2006.01)
C08K 9/02    (2006.01)
C08K 3/08    (2006.01)
```

(56) References Cited

U.S. PATENT DOCUMENTS

| | | | |
|---|---|---|---|
| 2015/0008016 A1* | 1/2015 | Poon | H05K 1/0274 174/253 |
| 2016/0060468 A1* | 3/2016 | Kim | C09D 5/24 428/323 |
| 2017/0226353 A1* | 8/2017 | Zhou | C01B 32/158 |

OTHER PUBLICATIONS

Mahsid Sam et al.; "Field-directed assembly of nanowires: identifying directors, disruptors and indices to maximize device yield"; Nanoscale; vol. 8; pp. 889-900; 2016 (12 pages).

Mahsid Sam et al.; "Field-directed chaining of nanowires: towards transparent electrodes"; Materials Letters; vol. 163; pp. 205-208; 2016 (4 pages).

Martin Theuring et al.; "Laser perforated ultrathin metal films for transparent electrode applications"; Optics Express; vol. 23, No. 7; DOI:10.1364/OE.23.00A254; pp. A254-A262; Apr. 2015 (9 pages).

Martin Z. Bazant et al.; "Diffuse-Charge Dynamics in Electrochemical Systems"; Physical Review E; vol. 70; arXiv: cond-mat/0401118 [cond-mat.soft]; 2004 (26 pages.).

Miao Yu et al.; "Recent advances in solar cells based on one-dimensional nanostructure arrays"; Nanoscale; vol. 4; pp. 2783-2796; 2012 (14 pages).

Micheal C. Wang et al.;' "Directed assembly of nanowires"; Materials Today; vol. 12, No. 5; pp. 34-43; May 2009 (10 pages).

Mingwei Li et al. "Template-Grown Metal Nanowires as Resonators: Performance and Characterization of Dissipativeand Elastic Properties"; Nano Letters; vol. 7, No. 11; pp. 3281-3284; 2007 (5 pages).

Mingwei Li; "Hybrid Integration of Nanowire Resonator Arrays"; PhD Thesis; May 2008 (179 pages).

Mingwei Li et al.; "Bottom-up assembly of large-area nanowire resonator arrays"; Nature Nanotechnology; vol. 3; pp. 88-92; Feb. 2008 (5 pages).

Moria Kwiat et al.; "Large-scale ordered 1D-nanomaterials arrays: Assembly or not?"; Nano Today; vol. 8, No. 6, pp. 677-694; 2013 (18 pages).

Mukul Kumar et al.; "Chemical Vapor Deposition of Carbon Nanotubes: A Review on Growth Mechanism and Mass Production"; Journal of Nanoscience and Nanotechnology; vol. 10, No. 6; pp. 3739-3758; 2010 (20 pages).

Myung-Gyu Kang et al.; "Organic Solar Cells Using Nanoimprinted Transparent Metal Electrodes"; Advanced Materials; vol. 20; pp. 4408-4413; 2008 (6 pages).

N. G. Green et al.; "Fluid flow induced by nonuniform ac electric fields in electrolytes on microelectrodes. I. Experimental measurements"; Physical Review E; vol. 61, No. 4; pp. 4011-4018; Apr. 2000 (8 pages).

N. K. R Palapati et al.; "Single nanowire manipulation within dielectrophoretic force fields in the sub-crossover frequency regime"; Nanoscale; vol. 7; pp. 3109-3116; 2015 (8 pages).

Neil P. Dasgupta et al.; "25th Anniversary Article: Semiconductor Nanowires—Synthesis, Characterization, and Applications"; Advanced Materials; vol. 26; pp. 2137-2184; 2014 (48 pages).

Nima Moghimian et al.; "Rhodium nanowires: Synthesis and nanostructure tailoring by controlling hydrogen evolution"; Materials Letters; vol. 113; pp. 152-155; 2013 (4 pages).

Nima Moghimian; "Electrochemical Control for Nanoelectromechanical Device Production"; PhD Thesis; 2015 (196 pages).

Peter B. Catrysse et al.; "Nanopatterned Metallic Films for Use As Transparent Conductive Electrodes in Optoelectronic Devices"; Nano Letters; vol. 10; pp. 2944-2949; 2010 (6 pages).

Peter Blake et al.; "Graphene-Based Liquid Crystal Device"; Nano Letters; vol. 8, No. 6; pp. 1704-1708; 2008 (5 pages).

Peter N. Nirmalraj et al.; "Manipulating Connectivity and Electrical Conductivity in Metallic Nanowire Networks"; Nano Letters; vol. 12; pp. 5966-5971; 2012 (6 pages).

Peyman Mirtaheri et al.; "Electrode Polarization Impedance in Weak NaCl Aqueous Solutions"; IEEE Transactions on Biomedical Engineering; vol. 52, No. 12; pp. 2093-2099; Dec. 2005 (7 pages).

R. Ramya et al.; "Conducting polymers-based electrochemical supercapacitors—Progress and prospects"; Electrochimica Acta; vol. 101; pp. 109-129; 2013 (21 pages).

Richard G. Hobbs et al.; "Semiconductor Nanowire Fabrication by Bottom-up and Top-down Paradigms"; Chemistry of Materials; vol. 24; pp. 1975-1991; 2012 (17 pages).

Robert C. Tenent et al.' "Ultrasmooth, Large-Area, High-Uniformity, Conductive Transparent Single-Walled-Carbon-Nanotube Films for Photovoltaics Produced by Ultrasonic Spraying"; Advanced Materials; vol. 21; pp. 3210-3216; 2009 (7 pages).

Robert Kretschmer et al.; "Pearl Chain Formation of Nanoparticles in Microelectrode Gaps by Dielectrophoresis"; Langmuir; vol. 20, No. 26; pp. 11797-11801; 2004 (5 pages).

Ronald Pethig; "Review Article—Dielectrophoresis: Status of the theory, technology, and applications"; Biomicrofluidics; vol. 4, No. 2; pp. 022811-1-022811-35; 2010 (35 pages).

Rustom B. Bhiladvala et al.; "Effect of fluids on the Q factor and resonance frequency of oscillating micrometer and nanometer scale beams"; Physical Review E; vol. 69; pp. 036307-1-036307-5; 2004 (5 pages).

Rustom B. Bhiladvala; "Nanomechanical Resonant Sensors and Fluid Interactions"; Encyclopedia of Nanotechnology; pp. 1630-1643; 2012 (14 pages).

S. W. Lee et al.; "Dielectrophoresis and electrohydrodynamics-mediated fluidic assembly of silicon resistors"; Applied Physics Letters; vol. 83, No. 18; pp. 3833-3835; Nov. 2003 (3 pages).

Sanggil Nam et al.; "Ultrasmooth, extremely deformable and shape recoverable Ag nanowire embedded transparent electrode"; Scientific Reports, vol. 4: 4788; 2014; DOI: 10.1038/srep04788 (7 pages).

Sarah J. Boehm et al.; "Formation and Frequency Response of Two-Dimensional Nanowire Lattices in an Applied Electric Field"; Langmuir; vol. 31; pp. 5779-5786; 2015 (8 pages).

Sasan Ghashghaie et al.; "Effect of Low Frequency Electric Field Parameters on Chain Formation of ZnO Nanoparticles for Gas Sensing Applications"; Journal of the American Ceramic Society; vol. 95, No. 6; pp. 1843-1850, 2012 (8 pages).

Simon O. Lumsdon et al.; "Assembly of Colloidal Particles into Microwires Using an Alternating Electric Field"; Langmuir; vol. 21, No. 11; pp. 4874-4880; 2005 (7 pages).

Sourobh Raychaudhuri et al.; "Precise Semiconductor Nanowire Placement Through Dielectrophoresis"; Nano Letters; vol. 9, No. 6; pp. 2260-2266; 2009 (7 pages).

Stephen R. Forrest; "The path to ubiquitous and low-cost organic electronic appliances on plastic"; Nature; vol. 428; pp. 911-918; Apr. 2004 (8 pages).

Stergios J. Papadakis et al.; "Quantitative analysis of parallel nanowire array assembly by dielectrophoresis"; Nanoscale; vol. 3; pp. 1059-1065; 2011 (7 pages).

Sudhir Cherukulappurath et al.; "Rapid and Sensitive in Situ SERS Detection Using Dielectrophoresis"; Chemistry of Materials; vol. 26; pp. 2445-2452; 2014 (8 pages).

Sukang Bae et al.; "Roll-to-roll production of 30-inch graphene films for transparent electrodes"; Nature Nanotechnology; vol. 5; pp. 574-578; Aug. 2010; DOI: 10.1038/NNAN0.2010.132 (5 pages).

Thomas B. Jones;"Basic Theory of Dielectrophoresis and Electrorotation"; IEEE Engineering in Medicine and Biology Magazine; pp. 33-42; 2003 (10 pages).

(56) References Cited

OTHER PUBLICATIONS

Tuhin Sahai et al.; "Thermomechanical transitions in doubly-clamped micro-oscillators"; International Journal of Non-Linear Mechanics; vol. 42; pp. 596-607; 2007 (12 pages).
Uksong Kang et al.; "A High-Speed Capacitive Humidity Sensor with On-Chip Thermal Reset"; IEEE Transactions on Electron Devices; vol. 47, No. 4; pp. 702-710; Apr. 2000 (9 pages).
Vittorio Scardaci et al.; "Spray Deposition of Highly Transparent, Low-Resistance Networks of Silver Nanowires over Large Areas"; Small; vol. 7, No. 18; pp. 2621-2628; 2011 (8 pages).
W. Fang et al.; "Determining mean and gradient residual stresses in thin films using micromachined cantilevers"; Journal of Micromechanics and Microengineering; vol. 6; pp. 301-309; 1996 (9 pages).
Waqqar Ahmed et al.; "Quantitative Analysis of Gold Nanorod Alignment after Electric Field-Assisted Deposition"; Nano Letters; vol. 9, No. 11; pp. 3786-3794; 2009 (9 pages).
Wei Lu et al.; "Semiconductor nanowires"; Journal of Physics D: Applied Physics; vol. 39; pp. R387-R406; 2006 (20 pages).
Wenbin Kang et al.; "Foldable Electronics Enabled by Nanopaper Transfer Method"; Advanced Functional Materials; vol. 25; pp. 4203-42210; 2015 (8 pages).
Xi Liu et al.; "Large-Scale Integration of Semiconductor Nanowires for High-Performance Flexible Electronics"; ACS Nano; vol. 6, No. 3; pp. 1888-1900; 2012 (13 pages).
Xueyan Wu et al.; "Synthesis and Electrical and Mechanical Properties of Silicon and Germanium Nanowires"; Chemistry of Materials; vol. 20, No. 19; pp. 5954-5967; 2008 (14 pages).
Y. Calahorra et al.; "Young's Modulus, Residual Stress, and Crystal Orientation of Doubly Clamped Silicon Nanowire Beams"; Nano Letters; vol. 15; pp. 2945-2950; 2015 (6 pages).
A. Castellanos et al.; "Electrohydrodynamics and dielectrophoresis in microsystems: scaling laws"; Journal of Physics D: Applied Physics; vol. 36; pp. 2584-2597; 2003 (14 pages).
A. San Paulo et al.; "Mechanical elasticity of single and double clamped silicon nanobeams fabricated by the vapor-liquid-solid method"; Applied Physics Letters; vol. 87, 053111; 2005 (4 pages).
A. W. Maijenburg et al.; "Dielectrophoretic alignment of metal and metal oxide nanowires and nanotubes: A universal set of parameters for bridging prepatterned microelectrodes"; Journal of Colloid and Interface Science; vol. 355; pp. 486-493; 2011 (8 pages).
A.I. Oliva-Avilés et al.; "Dielectrophoretic modeling of the dynamic carbon nanotube network formation in viscous media under alternating current electric fields"; Carbon; vol. 69; pp. 342-354; 2014 (13 pages).
Adrian Chirilă et al.; "Highly efficient Cu(In,Ga)Se2 solar cells grown on flexible polymer films"; Nature Materials; vol. 10; pp. 857-861; Nov. 2011 (5 pages).
Andreas Heidelberg et al.; "A Generalized Description of the Elastic Properties of Nanowires"; Nano Letters; vol. 6, No. 6; pp. 1101-1106; 2006 (6 pages).
Andrew Carlson et al.; "Transfer Printing Techniques for Materials Assembly and Micro/Nanodevice Fabrication"; Advanced Materials; vol. 24; pp. 5284-5318; 2012 (35 pages).
Anuj R. Madaria et al.; "Large scale, highly conductive and patterned transparent films of silver nanowires on arbitrary substrates and their application in touch screens"; Nanotechnology; vol. 22, 245201; 2011 (7 pages).
Anuj R. Madaria et al.; "Uniform, Highly Conductive, and Patterned Transparent Films of a Percolating Silver Nanowire Network on Rigid and Flexible Substrates Using a Dry Transfer Technique"; Nano Research; vol. 3; pp. 564-573; 2010 (10 pages).
B. Ilic et al.; "Enumeration of DNA Molecules Bound to a Nanomechanical Oscillator"; Nano Letters; vol. 5, No. 5; pp. 925-929; 2005 (5 pages).
Benjamin D. Smith et al.; "Deterministic Assembly of Functional Nanostructures Using Nonuniform Electric Fields"; Annual Review of Physical Chemistry; vol. 63; pp. 241-263; 2012 (26 pages).
Brian C. Gierhart et al.; "Frequency Dependence of Gold Nanoparticle Superassembly by Dielectrophoresis"; Langmuir; vol. 23, No. 24; pp. 12450-12456; 2007 (7 pages).
Brian R. Burg et al.; "Electrokinetic framework of dielectrophoretic deposition devices;" Journal of Applied Physics; vol. 107; pp. 124308-01-124308-11; 2010 (12 pages).
Choong-Heui Chung et al.; "Solution-Processed Flexible Transparent Conductors Composed of Silver Nanowire Networks Embedded in Indium Tin Oxide Nanoparticle Matrices"; Nano Research; vol. 5, No. 11; pp. 805-814; 2012 (10 pages).
D. Mijatovic et al.; "Technologies for nanofluidic systems: top-down vs. bottom-up a review"; Lab on a Chip; vol. 5; pp. 492-500; 2005 (9 pages).
D. S. Ghosh et al.; "High figure-of-merit ultrathin metal transparent electrodes incorporating a conductive grid"; Applied Physics Letters; vol. 96, 041109; 2010 (4 pages).
Dae-Hyeong Kim et al.; "Inorganic semiconductor nanomaterials for flexible and stretchable bio-integrated electronics"; NPG Asia Materials; vol. 4, e15; pp. 1-9; Apr. 2012 (9 pages).
Dongmok Whang et al.; "Large-Scale Hierarchical Organization of Nanowire Arrays for Integrated Nanosystems"; Nano Letters; vol. 3, No. 9; pp. 1255-1259; 2003 (5 pages).
Dustin L. House et al.; "Numerical study on dielectrophoretic chaining of two ellipsoidal particles"; Journal of Colloid and Interface Science; vol. 374; pp. 141-149; 2012 (9 pages).
Eric Sage et al.; "Neutral particle mass spectrometry with nanomechanical systems"; Nature Communications; vol. 6, No. 6482; 2015 (5 pages).
Erik C. Garnett et al.; "Nanowire Solar Cells"; Annual Review of Materials Research; vol. 41; pp. 269-295; 2011 (29 pages).
Erik C. Garnett et al.; "Self-limited plasmonic welding of silver nanowire junctions"; Nature Materials; vol. 11; pp. 241-249; Mar. 2012 (9 pages).
Erik M. Freer et al.; "High-yield self-limiting single-nanowire assembly with dielectrophoresis"; Nature Nanotechnology; vol. 5; pp. 525-530; Jul. 2010 (6 pages).
Hiroshi Kawaguchi et al.; "Cut-and-Paste Customization of Organic FET Integrated Circuit and Its Application to Electronic Artificial Skin"; IEEE Journal of Solid-State Circuits; vol. 40, No. 1; pp. 177-185; Jan. 2005 (9 pages).
Hongmei Xu et al.; "Direct synthesis of graphene 3D-coated Cu nanosilks network for antioxidant transparent conducting electrode"; Nanoscale; vol. 7; pp. 10613-10621; 2015 (9 pages).
Hoon-sik Kim et al.; "Unusual strategies for using indium gallium nitride grown on silicon (111) for solid-state lighting"; Proceedings of the National Academy of Sciences; vol. 108, No. 25; pp. 10072-10077; Jun. 2011 (7 pages).
Hui Wu et al.; "A transparent electrode based on a metal nanotrough network"; Nature Nanotechnology; vol. 8; pp. 421-425; Jun. 2013 (5 pages).
Hui Wu et al.; "Electrospun Metal Nanofiber Webs as High-Performance Transparent Electrode"; Nano Letters; vol. 10; pp. 4242-4248; 2010 (7 pages).
J. Chaste et al.; "A nanomechanical mass sensor with yoctogram resolution"; Nature Nanotechnology; vol. 7; pp. 301-304; May 2012 (4 pages).
J. Christopher Love et al.; "Fabrication of Nanometer-scale Features by Controlled Isotropic Wet Chemical Etching"; Advanced Materials; vol. 13, No. 8; pp. 604-607; Apr. 2001 (4 pages).
J. J. Boote et al; "Dielectrophoretic manipulation and electrical characterization of gold nanowires"; Nanotechnology; vol. 16; pp. 1500-1505; 2005 (7 pages).
James A. Sioss et al.; "Nanoresonator chip-based RNA sensor strategy for detection of circulating tumor cells: response using PCA3 as a prostate cancer marker"; Nanomedicine: NBM; 2011; xx:1-9; doi:10.1016/j.nano.2011.11.009 (9 pages).
Jingyu Zou et al.; "Interfacial Engineering of Ultrathin Metal Film Transparent Electrode for Flexible Organic Photovoltaic Cells"; Advanced Materials; 2014; DOI: 10.1002/adma.201306212 (7 pages).
John P. Singh et al.; "One- and two-dimensional assembly of colloidal ellipsoids in ac electric fields"; Physical Review E; vol. 79, No. 5; pp. 050401-1-050401-4; 2009 (4 pages).
Jon Luecke et al.; "Electrical Conductivity and pHe Response of Fuel Ethanol Contaminants"; Energy & Fuels; vol. 28; pp. 5222-5228; 2014 (7 pages).

(56) References Cited

OTHER PUBLICATIONS

Jonathan Viventi et al.; "Flexible, foldable, actively multiplexed, high-density electrode array for mapping brain activity in vivo"; Nature Neuroscience; vol. 14, No. 12; pp. 1599-1605; Dec. 2011 (9 pages).

Jorik van de Groep et al.; "Transparent Conducting Silver Nanowire Networks"; Nano Letters; vol. 12; pp. 3138-3144; 2012 (7 pages).

Josh Goldberger et al.; "Silicon Vertically Integrated Nanowire Field Effect Transistors"; Nano Letters; vol. 6, No. 5; pp. 973-977, 2006 (5 pages).

Joshua A. Spechler et al.; "Improved Efficiency of Hybrid Organic Photovoltaics by Pulsed Laser Sintering of Silver Nanowire Network Transparent Electrode"; ACS Applied Materials & Interfaces; vol. 7; pp. 10556-10562; 2015 (7 pages).

Joun Lee et al.; "Selective and Rapid Room Temperature Detection of H2S Using Gold Nanoparticle Chain Arrays"; Electroanalysis; vol. 23, No. 11; pp. 2623-2628; 2011 (6 pages).

Jung-Yong Lee et al.; "Semitransparent Organic Photovoltaic Cells with Laminated Top Electrode"; Nano Letters; vol. 10; pp. 1276-1279; Mar. 2010 (5 pages).

Jung-Yong Lee et al.; "Solution-Processed Metal Nanowire Mesh Transparent Electrodes"; Nano Letters; vol. 8, No. 2; pp. 689-692; 2008 (6 pages).

Junya Suehiro et al.; "Dielectrophoretic fabrication and characterization of a ZnO nanowire-based UV photosensor"; Nanotechnology; vol. 17; pp. 2567-2573; 2006 (7 pages).

Junya Suehiro et al.; "Fabrication of a carbon nanotube-based gas sensor using dielectrophoresis and its application for ammonia detection by impedance spectroscopy"; Journal of Physics D: Applied Physics; vol. 36; pp. L109-L114; 2003 (7 pages).

Junya Suehiro; "Fabrication and characterization of nanomaterial-based sensors using dielectrophoresis"; Biomicrofluidics; vol. 4; pp. 022804-1-022804-10; 2010 (10 pages).

Ketan H. Bhatt et al.; "Control and Modeling of the Dielectrophoretic Assembly of On-Chip Nanoparticle Wires"; Langmuir; vol. 20, No. 2; pp. 467-476; 2004 (10 pages).

Klaus Ellmer; "Past achievements and future challenges in the development of optically transparent electrodes"; Nature Photonics; vol. 6; pp. 809-817; Dec. 2012 (9 pages).

Liangbing Hu et al.; "Metal nanogrids, nanowires, and nanofibers for transparent electrodes"; MRS Bulletin; vol. 36; pp. 760-765; Oct. 2011 (6 pages).

Liangbing Hu et al.; "Scalable Coating and Properties of Transparent, Flexible, Silver Nanowire Electrodes"; ACS Nano; vol. 4, No. 5; pp. 2955-2963; 2010 (9 pages).

M.-W. Ahn et al.; "On-chip fabrication of ZnO-nanowire gas sensor with high gas sensitivity"; Sensors and Actuators B; vol. 138; pp. 168-173; 2009 (6 pages).

Y. T. Yang et al.; "Zeptogram-Scale Nanomechanical Mass Sensing"; Nano Letters; vol. 6, No. 4; pp. 583-586; Apr. 2006 (4 pages).

Yaling Liu et al.; "Dielectrophoretic Assembly of Nanowires"; The Journal of Physical Chemistry B; vol. 110, No. 9; pp. 14098-14106; 2006 (9 pages).

Yaping Dan et al.; "Dielectrophoretically assembled polymer nanowires for gas sensing"; Sensors and Actuators B; vol. 125; pp. 55-59; 2007 (5 pages).

Ye Ai et al.; "Direct numerical simulation of AC dielectrophoretic particle—particle interactive motions"; Journal of Colloid and Interface Science; vol. 417; pp. 72-79; 2014 (8 pages).

Yin Zhang; "Deflections and curvatures of a film-substrate structure with the presence of gradient stress in MEMS applications"; Journal of Micromechanics and Microengineering; vol. 17; pp. 753-762; 2007 (11 pages).

Yu Huang et al.; "Directed Assembly of One-Dimensional Nanostructures into Functional Networks"; Science; vol. 291; pp. 630-633; Jan. 2001 (6 pages).

Yu Huang et al.; "Nanowires for Integrated Multicolor Nanophotonics"; Small; vol. 1; pp. 142-147; 2005 (6 pages).

Yugang Sun et al.; "Inorganic Semiconductors for Flexible Electronics"; Advanced Materials; vol. 19; pp. 1897-1916; 2007 (20 pages).

Zhe Liu et al.; "Flexible electronics based on inorganic nanowires"; Chemical Society Reviews; vol. 44; pp. 161-192; 2015 (33 pages).

Zhiyong Fan et al.; "Toward the Development of Printable Nanowire Electronics and Sensors"; Advanced Materials; vol. 21; pp. 3730-3743; 2009 (14 pages).

Zhiyong Fan et al.; "Wafer-Scale Assembly of Highly Ordered Semiconductor Nanowire Arrays by Contact Printing"; Nano Letters; vol. 8, No. 1; pp. 20-25, 2008 (13 pages).

Dow; Technical Data Sheet for Isopropanol; Form No. 327-00031-0812; 2012 (3 pages).

\* cited by examiner

MATERIALS AND METHODS FOR CONDUCTIVE THIN FILMS

CROSS REFERENCE TO RELATED APPLICATIONS

This application is a continuation-in-part of U.S. patent application Ser. No. 15/789,877 filed on Oct. 20, 2017 and entitled "Nanowire Chain Devices, Systems, and Methods of Production" which is incorporated in its entirety herein by reference. U.S. patent application Ser. No. 15/789,877 claims the benefit of U.S. Provisional Application No. 62/411,354 filed on Oct. 21, 2016 and titled "Nanowire Chain Devices, Systems, and Methods of Production" is also incorporated in its entirety herein by reference.

BACKGROUND

Electronic devices use a variety of insulating, conducting, and semiconducting materials and/or layers. Some types of electronic devices generate or respond to electromagnetic radiation. Many of the commonly used insulating, conducting, and semiconducting materials and/or layers are opaque to or attenuate electromagnetic radiation.

SUMMARY

In one aspect, a material composition for manufacturing a translucent conductive film in accordance with one or more embodiments of the invention includes a fluid. The material composition further includes nanostructures disposed within the fluid. The material composition further includes a component that modifies a structure of a joint formed between at least two nanostructures of the plurality of nanostructures after the component is activated.

In one aspect, a method of generating a joint-modified partially-aligned nanostructure film in accordance with one or more embodiments of the invention includes obtaining a material composition. The material composition includes a fluid, high aspect ratio nanostructures disposed in the fluid, and a heat activated component that modifies joints when activated. The method further includes obtaining a partially-aligned nanostructure film using the obtained material composition and processing the partially-aligned nanostructure film to obtain a joint-modified partially-aligned nanostructure film. Processing the partially-aligned nanostructure film includes heating the partially-aligned nanostructure film to a temperature that is greater than an activation temperature of the heat activated component. The temperature is less than a melting temperature of the high aspect ratio nanostructures.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
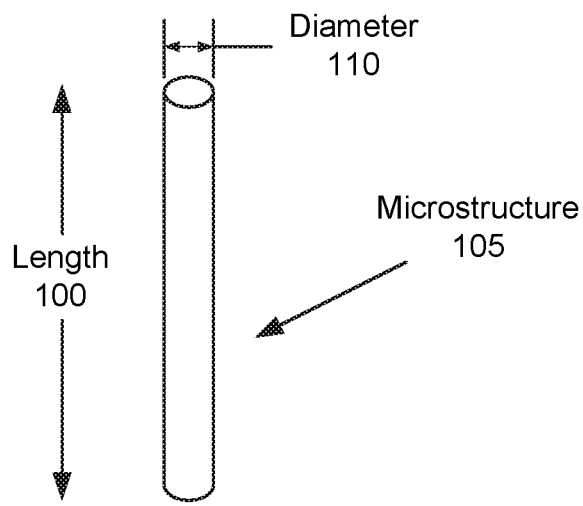
FIG. 1A shows a diagram of a nanostructure in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of FIGS. 1A-2D, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the invention relate to materials and methods for manufacturing conductive films. The conductive films may be partially transparent to electromagnetic radiation. For example, the conductive thin films may transit 85% or more electromagnetic radiation that is incident on the films. In one or more embodiments of the invention, the electromagnetic radiation is visible light.

In one or more embodiments of the invention, a material composition for manufacturing conductive films includes a fluid, nanostructures that form the conductive film, and a component that modifies a joint between at least two nanostructures during and/or after the formation of the nanostructure film. In one or more embodiments of the invention, the nanostructures and component may be disposed within the fluid. The material composition may include additional materials or components without departing from the invention.

In one or more embodiments of the invention, the fluid of the material composition acts as a medium for transporting the nanostructures and/or component. For example, the fluid may be a carrier fluid that assists in moving the nanostructures and/or component of the material composition to a desired location. As will be discussed in greater detail below, transporting the nanostructures and/or component in a fluid may enable a film of the nanostructures and/or component to be deposited on a surface efficiently.

In one or more embodiments of the invention, the fluid includes a polar solvent. In one or more embodiments of the invention, the polar solvent is water. In one or more embodiments of the invention, the polar solvent is an alcohol. In one or more embodiments of the invention, the alcohol is one of ethanol, methanol, isopropyl alcohol, butanol, pentanol, cetyl alcohol, ethylene glycol, propylene glycol, and glycerol.

In one or more embodiments of the invention, the fluid includes a polar solvent and an alcohol. In one or more embodiments of the invention, the polar solvent is one of water, acetone, tetrahydrofuran, ethyl acetate, dimethylformamide, acetonitrile, dimethyl sulfoxide, nitromethane, and propylene carbonate. In one or more embodiments of the invention, the alcohol is one of ethanol, methanol, isopropyl alcohol, butanol, pentanol, cetyl alcohol, ethylene glycol, propylene glycol, and glycerol.

In one or more embodiments of the invention, the fluid includes a non-polar solvent. In one or more embodiments of the invention, the non-polar solvent is one of hexane, cyclohexane, pentane, cyclopentane, benzene, toluene, diethyl ether, and dichloromethane.

In one or more embodiments of the invention, the fluid includes a non-polar solvent and a polar solvent. In one or more embodiments of the invention, the non-polar solvent is one of hexane, cyclohexane, pentane, cyclopentane, benzene, toluene, diethyl ether, and dichloromethane. In one or more embodiments of the invention, the polar solvent is one of water, acetone, tetrahydrofuran, ethyl acetate, dimethylformamide, acetonitrile, dimethyl sulfoxide, nitromethane, propylene carbonate ethanol, methanol, isopropyl alcohol, butanol, pentanol, cetyl alcohol, ethylene glycol, propylene glycol, and glycerol.

While the fluid has been described above as a one or more component system, i.e., a polar solvent and an alcohol or a non-polar solvent and an alcohol, embodiments of the invention are not limited to a one or more component system. A fluid in accordance with embodiments of the invention may include any number of components. For example, a fluid in accordance with one or more embodiments of the invention may be a mixture of water, ethanol, and ethylene glycol. In a second example, a fluid in accordance with one or more embodiments of the invention may be a mixture of cyclohexane, ethanol, and butanol.

In one or more embodiments of the invention, the fluid may include a viscosity, surface tension, wetting, and/or vapor pressure modifying agent. The modifying agent may be included in the fluid to modify the viscosity, surface tension, wetting, and/or vapor pressure to meet a deposition process requirement. As will be discussed in further detail below, the material composition for depositing the nanostructures may need to meet predetermined rheological and/or physical properties to be deposited efficiently. To meet these or other requirements, the fluid may include the modifying agent to meet the aforementioned requirements. While described as a single agent, embodiments of the invention include fluids that include multiple modification agents.

In one or more embodiments of the invention, the modifying agent may be one of a glycol ether solvent, a dialkyl ether, or an ester. In one or more embodiments of the invention, the modifying agent may be a combination of one or more of a glycol ether solvent, a dialkyl ether, and an ester.

In one or more embodiments of the invention, the glycol ether solvent is Ethylene glycol monomethyl ether (2-methoxyethanol), Ethylene glycol monoethyl ether (2-ethoxyethanol), Ethylene glycol monopropyl ether (2-propoxyethanol), Ethylene glycol monoisopropyl ether (2-isopropoxyethanol), Ethylene glycol monobutyl ether (2-butoxyethanol), Ethylene glycol monophenyl ether (2-phenoxyethanol), Ethylene glycol monobenzyl ether (2-benzyloxyethanol), Diethylene glycol monomethyl ether (2-(2-methoxyethoxy)ethanol, methyl carbitol), Diethylene glycol monoethyl ether (2-(2-ethoxyethoxy)ethanol), or Diethylene glycol mono-n-butyl ether (2-(2-butoxyethoxy)ethanol).

In one or more embodiments of the invention, the dialkyl ether is Ethylene glycol dimethyl ether (dimethoxyethane), Ethylene glycol diethyl ether (diethoxyethane), or Ethylene glycol dibutyl ether (dibutoxyethane).

In one or more embodiments of the invention, the ester is Ethylene glycol methyl ether acetate (2-methoxyethyl acetate), Ethylene glycol monoethyl ether acetate (2-ethoxyethyl acetate), Ethylene glycol monobutyl ether acetate (2-butoxyethyl acetate), or Propylene glycol methyl ether acetate (1-methoxy-2-propanol acetate).

While the modifying agent has been described as including one or more of glycol ether solvent, a dialkyl ether, or an ester, embodiments of the invention are not limited to the aforementioned classes of materials for modifying the viscosity, surface tension, wetting, and/or vapor pressure of the fluid. Other classes of materials may be used to modify the viscosity, surface tension, wetting, and/or vapor pressure of the fluid without departing from the invention.

In one or more embodiments of the invention, the nanostructures are conductive particles. When deposited, the conductive particles may form a film that is electrically conductive. The conductive particles may be dispersed or suspended in the fluid before and/or during deposition of a nanostructure film. The conductive particles may include any quantity and type of particle, i.e., particle shape, without departing from the invention.

As used herein, dispersed or suspended means that the conductive particles for at least a period of time do not substantially precipitate out of the fluid following a dispersing or suspending procedure. The period of time may be, for example, 30 minutes. The period of time may be other durations without departing from the invention. As used herein, substantially precipitate means to precipitate out at least fifty percent of a material dispersed or suspended in a fluid.

For example, a quantity of conductive particles may be dispersed or suspended in a fluid by shaking a container including the fluid and the conductive particles. The shaking action may separate the particles within the fluid. Overtime, the particles may substantially precipitate out of the fluid but not before a period of time has elapsed.

The suspension procedure may be, for example, shaking the fluid, sonicating the fluid, stirring the fluid, or mixing the fluid. Other suspension procedures may be used without departing from the invention.

In one or more embodiments of the invention, the nanostructures are metallic. The nanostructures may be formed from, for example, copper, silver, gold, nickel, platinum, aluminum, zinc, iron, rhodium, or another conductive material. In one or more embodiments of the invention, the nanostructures are an alloy of one or more of the aforementioned metals. In one or more embodiments of the invention, the nanostructures have a conductivity of greater than 1,000,000 siemens/meter.

In one or more embodiments of the invention, the nanostructures consist essentially of a metal. As used herein, nanostructures consisting essentially of a metal means that the nanostructures are formed from at least 95% metal. One of ordinary skill will appreciate that other components may be included in the nanostructures for chemical synthesis requirements or other reasons. The inclusion of other components in the nanostructures should be understood as being within the scope of the nanostructures disclosed herein.

In one or more embodiments of the invention, the nanostructures consist essentially of carbon. As used herein, nanostructures consisting essentially of a carbon means that the nanostructures are formed from at least 95% carbon. The nanostructures may be, for example, nanotubes, nanoparticles, graphene, and/or a mixture of metal and carbon-based nanostructures. One of ordinary skill will appreciate that other components may be included in the nanostructures for chemical synthesis requirements or other reasons. The inclusion of other components in the nanostructures should be understood as being within the scope of the nanostructures disclosed herein.

In one or more embodiments of the invention, the nanostructures have a linear shape. In one or more embodiments of the invention, the nanostructures have an average diameter of between 50 nanometers and 500 nanometers. In one or more embodiments of the invention, the nanostructures have an average diameter of between 100 nanometers and 400 nanometers. In one or more embodiments of the invention, the nanostructures have an average diameter of between 200 nanometers and 300 nanometers. In one or more embodiments of the invention, the nanostructures have an average aspect ratio of greater than 10 to 1. For example, the nanostructures may have an average diameters of 100 nanometers and an average length of 1000 nanometers. In one or more embodiments of the invention, the nanostructures have an average aspect ratio of greater than 100 to 1. For example, the nanostructures may have an average diameters of 100 nanometers and an average length of 10000 nanometers. In one or more embodiments of the invention, the nanostructures have an average aspect ratio of greater than 1000 to 1. For example, the nanostructures may have an average diameters of 100 nanometers and an average length of 100000 nanometers.

In one or more embodiments of the invention, the nanostructures have linear shape and include sections of the length of different conductivities. For example, a first section may have a high conductivity, a second section may have a low conductivity, and a third section may have a high conductivity. The low conductivity may be less than 1,000 S/m and the high conductivity may be greater than 1,000,000 S/m.

In one or more embodiments of the invention, the nanostructures are semiconducting. The nanostructures may be formed from, for example, silicon, silicon carbide, germanium, zinc oxide, zinc sulfide, cadmium sulfide, cadmium selenide, cadmium telluride, gallium arsenide, titanium dioxide, iron oxide, cupric oxide, copper sulfide, or any combination of the aforementioned materials.

In one or more embodiments of the invention, the nanostructures are composites formed of a non-conducting portion and a conducting portion. The nanostructures may be, for example, metal coated dielectric rods. The rods may be formed from, for example, titanium dioxide, alumina, or a polymer. The non-conducting portion may have a high aspect ratio shape. The conducting portion may be, for example, a coating of silver, gold, or other conductor. The coating may be thin with respect to a thickness of the non-conducting portion.

In one or more embodiments of the invention, the nanostructures are composites formed of a semiconducting or low conductivity portion and a conducting portion. The nanostructures may be, for example, metal coated carbon nanotubes.

In one or more embodiments of the invention, all of the nanostructures have the same shape, i.e., mono-dispersed. The shape may be, for example, a rod or a tube. The nanostructures may be a different shape without departing from the invention.

FIG. 1A shows a diagram of an example of a rod shaped particle of nanostructures (105) in accordance with one or more embodiments of the invention. A material for forming a nanostructure film in accordance with one or more embodiments of the invention includes a quantity of rod shaped particles. When deposited, the nanostructures (105) may form a thin film with contact joints between the nanostructures that provide electrically conductive pathways throughout the nanostructure film. For additional details regarding nanostructure films and contact joints, See FIG. 1D.

The example rod shaped particle has a length (100) that this much larger than a diameter (110) of the particles. The rod shaped particle is a high aspect ratio particle because a cylinder circumscribing the rod shaped particles has a length that is much larger than its diameter. While illustrated as a perfect rod, the rod shaped particle may have some variation in diameter (110) along the length (100) of the particle, may bend, bow, have a serpentine shape, or otherwise have some difference from a perfect rod shape.

In one or more embodiments of the invention, the nanostructures include portions of particles having different shapes, i.e., poly-dispersed. For example, the nanostructures may include a first portion of rod shaped particles and a second portion of sphere shaped particles. In another example, the nanostructures may include a first portion of rod shaped particles having an aspect ratio of 100:1, a second portion of rod shape particles having an aspect ratio of 10:1, and a third portion of sphere shaped particles. The nanostructures may include any quantity of conductive particles of varying shapes without departing from the invention.

In one or more embodiments of the invention, the nanostructures include two different types of particles on two different size scales. For example, the nanostructures may include micron scale rod shaped particles and nanoscale sphere shaped particles. When such nanostructures are deposited, the nanoscale sphere shaped particles may be preferentially deposited at the contact joints between micron scale rod shaped particles. As will be discussed in greater detail below, depositing the nanoscale sphere particles at the contact joints may improve the resulting conductive film by reducing the contact resistance at the aforementioned contact joints.

In one or more embodiments of the invention, the conductive particles are nanowires, nanotubes, or other high aspect ratio particles. As used herein, an aspect ratio is a ratio of the length of a particle to a diameter of a particle. Spherical or cube shaped particles are low aspect ratio particles. In contrast, rod shaped particles having a length that is at least ten times larger than a diameter is a high aspect ratio particles. As used herein, a high aspect ratio particle refers to a particle that when encompassed by a virtual cylinder the virtual cylinder has a length that is at least ten times larger than the diameters of the virtual cylinder. In one or more embodiments of the invention, a high aspect ratio particle has a length that is greater than 30 times a diameter of the high aspect ratio particle.

In one or more embodiments of the invention, the component includes a material that is activated by heat. In other words, the material may be inert until it is heated to a temperature above the material's activation temperature. Upon activation, the component may modify the morphology of a joint between at least two of the nanostructures. In one or more embodiments of the invention, the modification by the component reduces the contact resistance between two nanostructures. Reducing the contact resistance improves the conductivity of a film made using the material composition while maintaining the transmission rate of electromagnetic radiation through the film.

In one or more embodiments of the invention, the component is a source of metallic ions. The source of metallic ions may be, for example, a metal salt. The metal salt may be, for example, silver nitrite, silver chloride, gold chloride, gold hydroxide, rhodium chloride, rhodium sulfate, or any combination of the aforementioned materials. The metal salt may be dissolved or otherwise suspended in the fluid.

In one or more embodiments of the invention, the component is a metallic salt or ester of a fatty acid. The fatty acid may be saturated or unsaturated. In one or more embodiments of the invention, the metal is gold or silver. In one or more embodiments of the invention, the fatty acid is decanoic acid (Capric acid) or dodecanoic acid (Lauric acid).

In one or more embodiments of the invention, the component is a metallic salt or ester of a carboxylic acid. In one or more embodiments of the invention, the carboxylic acid is neodecanoic acid. In one or more embodiments of the invention, the metal is gold or silver.

Figure 1B:
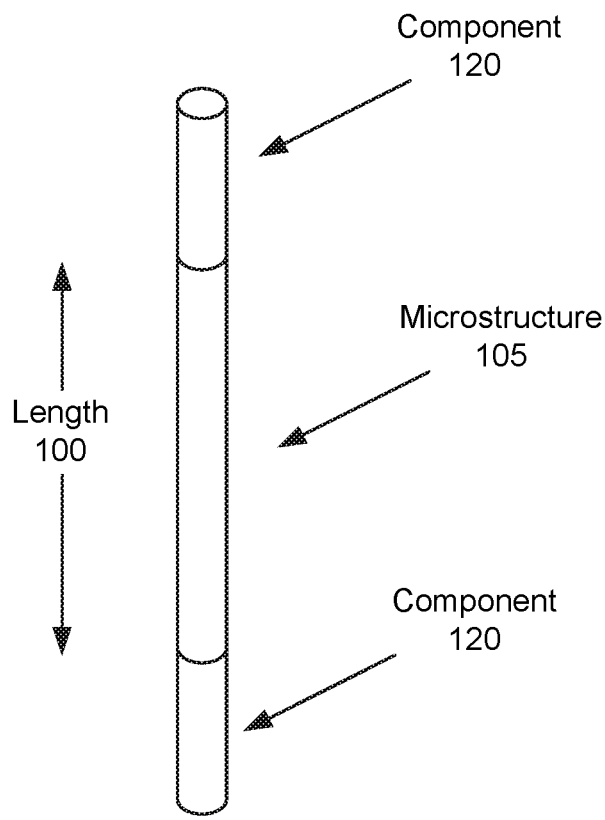
FIG. 1B shows a diagram of a nanostructure and a component in accordance with one or more embodiments of the invention.
Figure 1C:
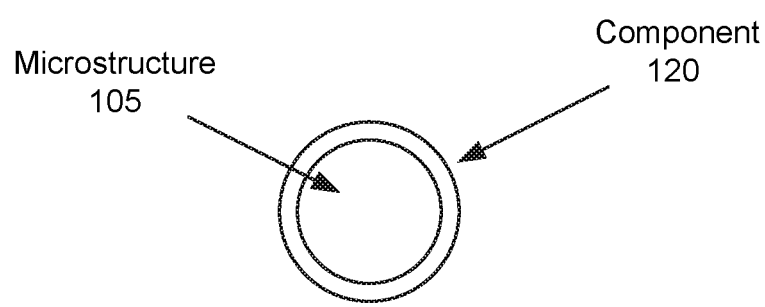
FIG. 1C shows a cross section diagram of a nanostructure and a component in accordance with one or more embodiments of the invention.

In one or more embodiments of the invention, the component is a structure attached to the nanostructures. For example, when synthesizing the nanostructures a component may be added to the nanostructures that is heat activated and results in a modification of joints between nanostructures. FIGS. 1B and 1C show examples of components attached to nanostructures.

FIG. 1B shows a diagram of a first example of a component (120) attached to a nanostructure (105) in accordance with one or more embodiments of the invention. As seen in FIG. 1B, the component includes two separate structures grafted onto a nanostructure (105). The separate structures are extensions of the rod shaped length (100) of the nanostructure.

In one or more embodiments of the invention, the component (120) is formed of a material having a lower melting temperature than the nanostructure (105). For example, the component (120) may be formed from silver while the nanostructure (105) is formed of copper. As will be discussed in greater detail with respect to FIGS. 1D-1G, this arrangement of materials and melting temperatures may enable joints within a nanostructure film to be modified while maintaining the conduction paths within the nanostructure film.

While illustrated as an extension of an existing nanostructure, a component (120) may have different shapes or geometries than the nanostructure without departing from the invention. For example, a component (120) may be formed as spheres disposed on each end of a rod shaped nanostructure.

FIG. 1C shows a cross section diagram of a second example of a component (120) attached to a nanostructure (105) in accordance with one or more embodiments of the invention. In FIG. 1C, the component is a layer disposed on a nanostructure (105). The layer may be formed by, for example, coating the nanostructure (105) with a metal or other material.

The coating may be formed from a material having a lower melting temperature than a material of which the nanostructure is formed. For example, the coating may be gold while the nanostructure is copper. When heated, as will be discussed in greater detail below, the coating may change to a liquid state or otherwise become mobile via solid state diffusion. Once mobile, the material of the coating may collect at joint locations and thereby modify the geometry of the joint.

While the coating is illustrated as an encapsulating layer in FIG. 1C, the coating may only cover a portion of the surface area of the nanostructure (105) without departing from the invention. For example, portions near the ends of the length of the nanostructures may be coated while the majority of the length may not be coated.

In one or more embodiments of the invention, the fluid may include a nanostructure stabilization agent. The nanostructure stabilization agent may increase the amount of time the nanostructures are suspended in the fluid following a suspension operation.

In one or more embodiments of the invention, the stabilization agent is a surfactant. In one or more embodiments of the invention, the surfactant is a polymer. In one or more embodiments of the invention, the polymer is polyvinylpyrrolidone.

As noted above, a material composition including a fluid, nanostructures, and a joint modifying component may be deposited onto a substrate to generate a film of nanostructure. In one or more embodiments of the invention, the film of nanostructures is generated by performing an electric field driven deposition process as disclosed in U.S. patent application Ser. No. 15/789,877 which is incorporated in its entirety herein by reference. U.S. patent application Ser. No. 15/789,877 claims the benefit of U.S. Provisional Application No. 62/411,354 which is also incorporated in its entirety herein by reference.

Via the method of the '877 patent application, a nanostructure film may be deposited. In one or more embodiments of the invention, the nanostructure film may be partially aligned. As used herein, a partially aligned film refers to a film in which the long axes of the nanostructures in the film are generally aligned with an axes. For example, rather than being randomly aligned, the majority of the nanostructures may be aligned with a preferred axes.

Figure 1D:
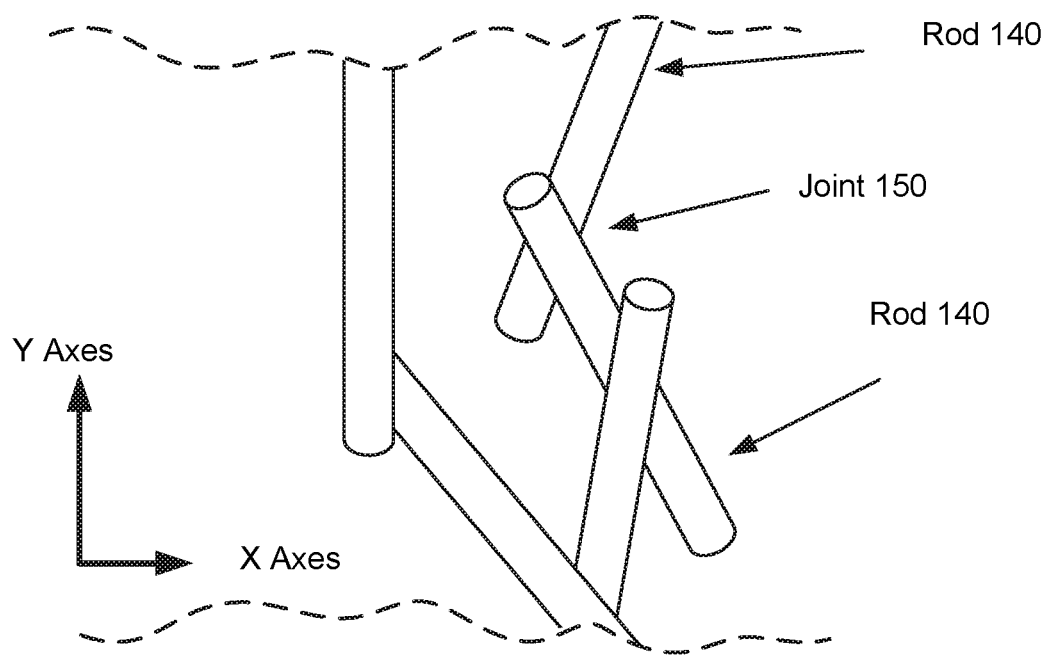
FIG. 1D shows a diagram of a nanostructure film in accordance with one or more embodiments of the invention.

FIG. 1D shows a diagram of a portion of an example nanostructure film. In the film, nanostructures are illustrated as rods (140). The rods are partially aligned with Y axes in FIG. 1D. Such a film may be generated using the method of the '877 patent application by aligning an electric field with the Y axes while depositing the material composition disclosed herein. Aligning the rods (140) may result in the ends of the rods touching each other and thereby forming continuous electrical pathways across the film.

Figure 1E:
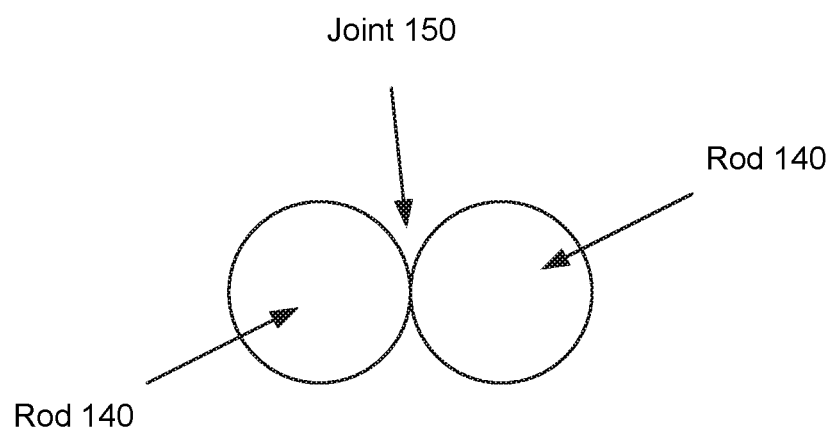
FIG. 1E shows a cross section diagram of a nanostructure joint in accordance with one or more embodiments of the invention.

While the rods (140) shown in FIG. 1D are aligned, the joints (150) between the rods (140) generally have a small contact area. FIG. 1E shows an illustration of the contact area between two example rods (140). As seen from the diagram, the contact area of the joint (150) is small because of the shape of the particle.

Small contact areas between particle joints result in high contact resistances between the particles. The high contact resistances between particles can negatively impact the resulting conductivity of the film. For example, high contact resistances within a film can decrease the effective conductivity of the film. One or more embodiments of the invention may improve the contact area in joints between particles and thereby improve the conductivity of the resulting film while maintaining the shape of the nanostructures in the film.

Figure 1F:
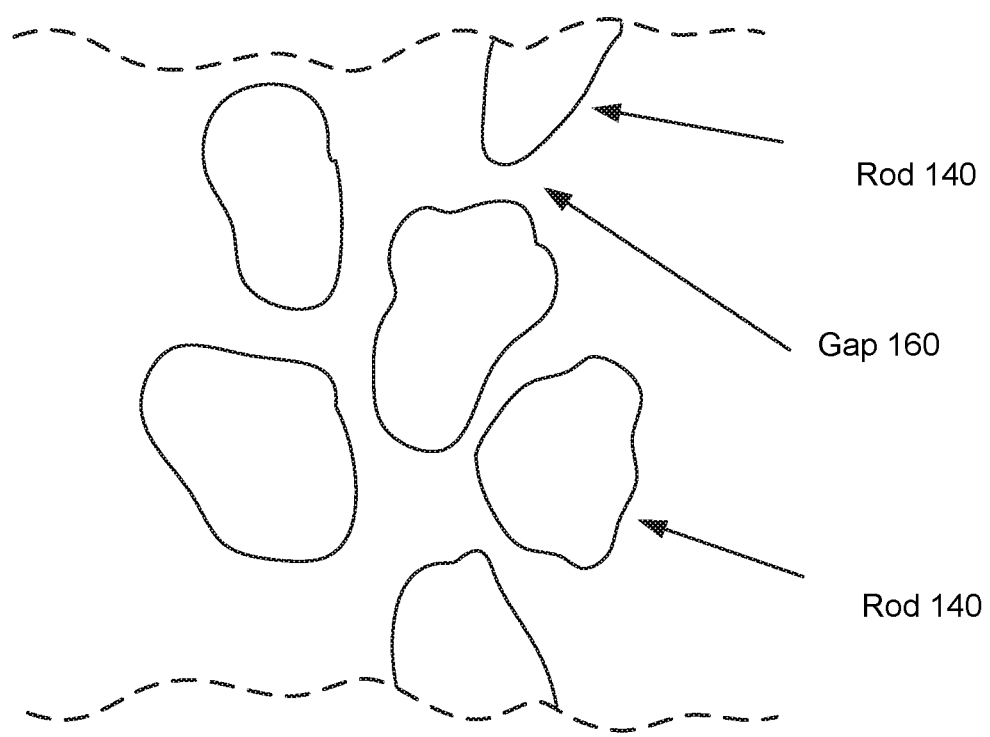
FIG. 1F shows a diagram of a nanostructure film after heating in accordance with one or more embodiments of the invention.

While the joints of the film illustrated in FIG. 1D might be improved through heat treatment, the aforementioned heat treatment causes deformation of the nanostructures. FIG. 1F shows a diagram of a nanostructure film after heating. As seen from FIG. 1F, heating the nanostructures above a threshold temperature of the nanostructures results in high aspect ratio particles changing shape, becoming closer to spherical. The threshold temperature may be substantially below the melting temperature of the bulk material from which the nanostructures are formed due to solid state diffusion or other transport effects. This change in shape introduces gaps (160) between the rods rather than improved joints between the rods. The aforementioned gaps (160) decrease the conductivity of the resulting film.

In one or more embodiments of the invention, a component that can be activated below a melting temperature of the nanostructures is deposited in the nanostructure film along with the nanostructures. By co-depositing both nanostructures and a component that can be activated, the contact area of joints between nanostructures in a film may be increased without changing the shape of the nanostructures.

Figure 1G:
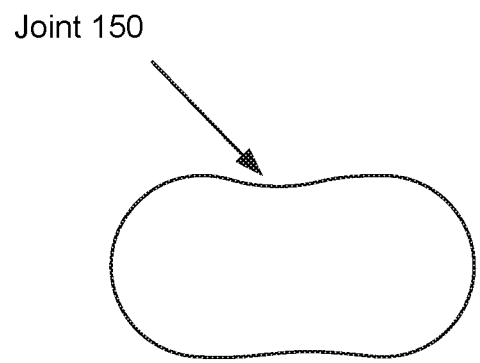
FIG. 1G shows a diagram of a nanostructure joint after activating a component in accordance with one or more embodiments of the invention.

FIG. 1G shows an example of a joint (150) after a component is activated. As seen in FIG. 1G, activation of the component increasing the contact area between the nanostructures. When incorporated into a film, the conductivity of the nanostructure film is greatly improved.

Figure 1H:
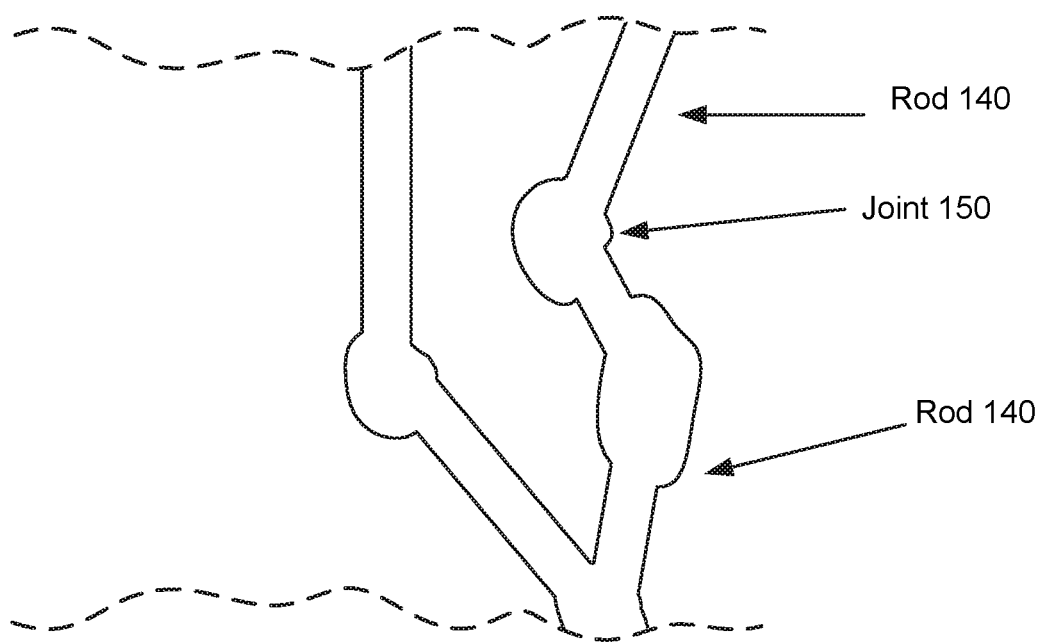
FIG. 1H shows a diagram of a nanostructure film after activating a component in accordance with one or more embodiments of the invention.

FIG. 1H shows an example of a nanostructure film after a component is activated. As seen in FIG. 1H, the activated component results in a change of the structure of the joints (150). More specifically, additional conductive material is located in the joints and thereby improves the contact area between nanostructures in the joints (150).

To generate a conductive film as illustrated in FIG. 1H, the methods illustrated in FIGS. 2A-2D may be used. While illustrated as separate methods, each of the methods illustrated in FIGS. 2A-2D may be performed sequentially or in parallel (or a combination of both serial and parallel execution) without departing from the invention. Further, one of ordinary skill will appreciate that some or all of these steps may be executed in different orders, may be combined or omitted, and some or all of the steps may be executed in parallel.

Figure 2A:
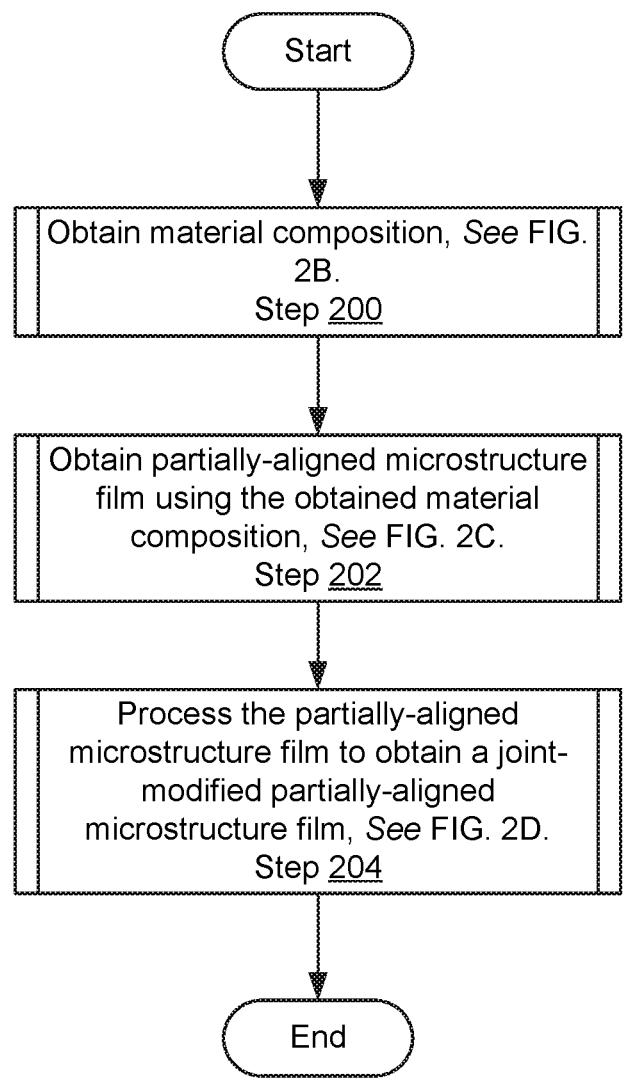
FIG. 2A shows a flowchart of a method of obtaining a joint-modified partially-aligned nanostructure film in accordance with one or more embodiments of the invention.

FIG. 2A shows a flowchart of a method in accordance with one or more embodiments of the invention. The method depicted in FIG. 2A may be used to obtain a joint-modified partially-aligned nanostructure film in accordance with one or more embodiments of the invention.

In Step 200, a material composition is obtained.

In one or more embodiments of the invention, the material composition includes, at least, a fluid, nanostructures, and a component that modifies the joints of a nanostructure film when activated. In one or more embodiments of the invention, the nanostructures are high aspect ratio rode shaped particles. The high aspect ratio rod shaped particles may have a diameter of between 200 and 400 micrometers. In one or more embodiments of the invention, the component may be activated to modify the joints. In one or more embodiments of the invention, the component may be activated by the application of heat, electromagnetic radiation, pressure, or another force.

Figure 2B:
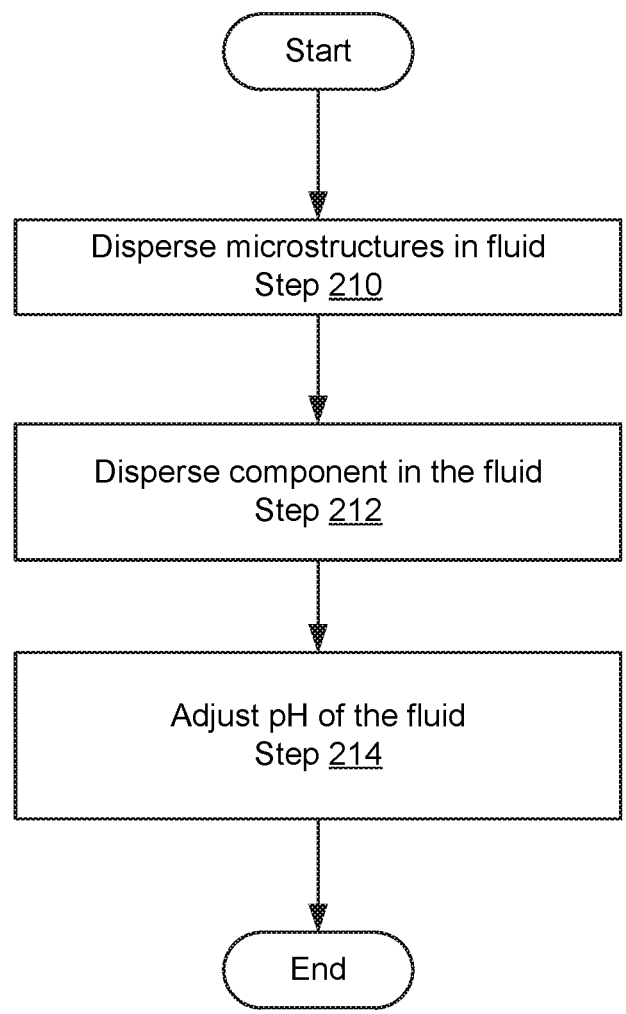
FIG. 2B shows a flowchart of a method of obtaining a material composition used to manufacture a joint-modified partially-aligned nanostructure film in accordance with one or more embodiments of the invention.

In one or more embodiments of the invention, the material composition is obtained via the method illustrated in FIG. 2B. The material composition may be obtained using other methods without departing from the invention.

In Step 202, a partially-aligned nanostructure film is obtained using the obtained material composition.

In one or more embodiments of the invention, the partially-aligned nanostructure film includes contact joints between the nanostructures a component that modifies the joints when activated.

Figure 2C:
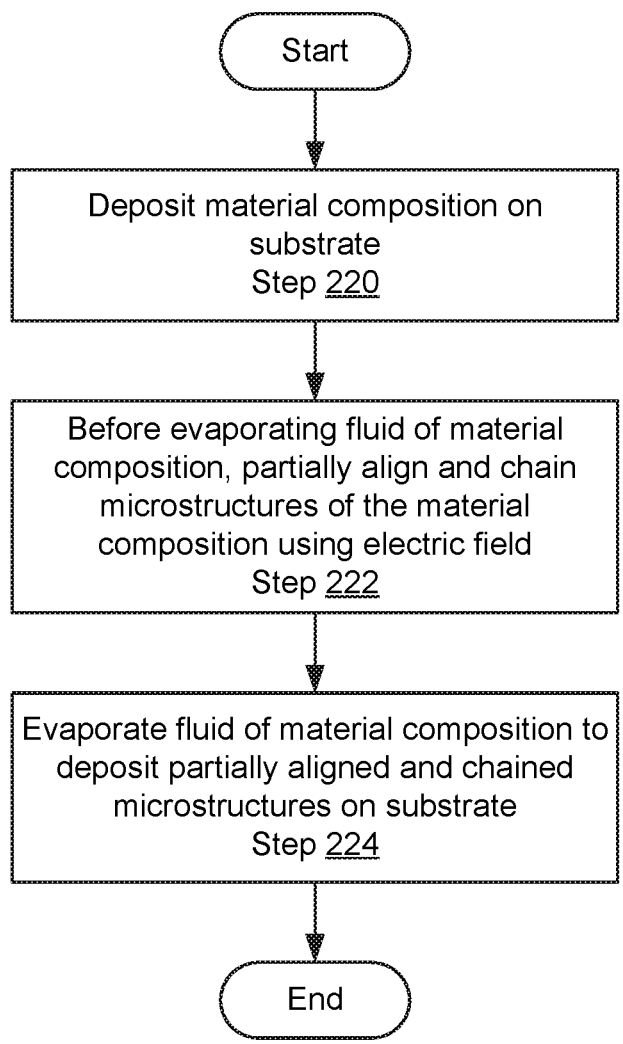
FIG. 2C shows a flowchart of a method of obtaining a partially-aligned nanostructure film using a material composition in accordance with one or more embodiments of the invention.

In one or more embodiments of the invention, the partially-aligned nanostructure film is obtained via the method illustrated in FIG. 2C. The partially-aligned nanostructure film may be obtained using other methods without departing from the invention.

In Step 204, the obtained partially-aligned nanostructure film is processed to obtain a joint-modified partially-aligned nanostructure film.

In one or more embodiments of the invention, the joint-modified partially-aligned nanostructure film includes joints that have a larger contact area when compared to the joints of the partially-aligned nanostructure film.

Figure 2D:
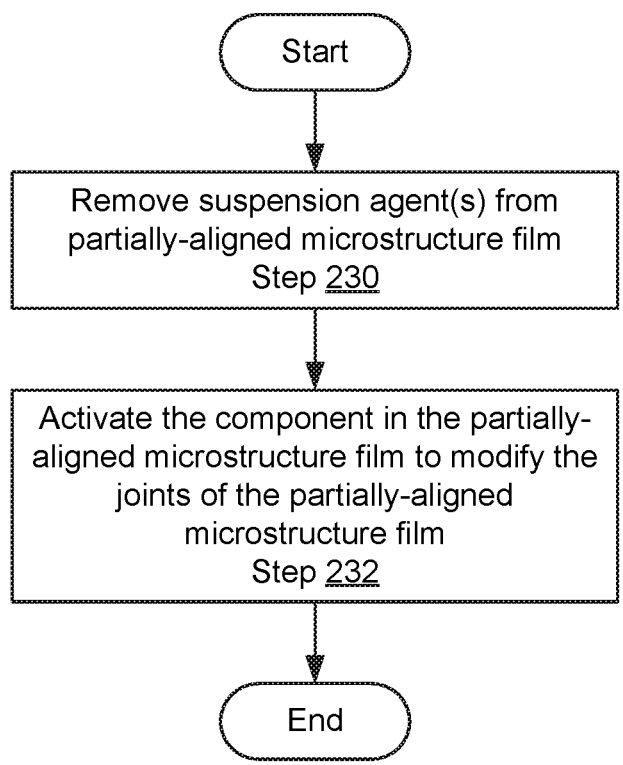
FIG. 2D shows a flowchart of a method of obtaining a joint-modified partially-aligned nanostructure film by modifying the joints of a partially-aligned nanostructure film in accordance with one or more embodiments of the invention.

In one or more embodiments of the invention, the joint-modified partially-aligned nanostructure film is obtained via the method illustrated in FIG. 2D. The joint-modified partially-aligned nanostructure film may be obtained using other methods without departing from the invention.

The method may end following Step 204.

FIG. 2B shows a flowchart of a method in accordance with one or more embodiments of the invention. The method depicted in FIG. 2B may be used to obtain a material composition in accordance with one or more embodiments of the invention.

In Step 210, nanostructures are dispersed in a fluid.

In one or more embodiments of the invention, the nanostructures are dispersed by sonicating the fluid while the nanostructures are in the fluid. In one or more embodiments of the invention, a suspension agent may be added to the fluid to disperse the nanostructures.

In Step 212, a component that can be activated is dispersed in the fluid.

In one or more embodiments of the invention, the component is dispersed by dissolving the component in the fluid. In one or more embodiments of the invention, the component is dispersed by suspending the component in the fluid. In one or more embodiments of the invention, the component is a metal salt.

In Step 214, the pH of the fluid is adjusted. As discussed in the '877 application, the pH of the fluid may be adjusted to suspend nanowire chains. The pH of the fluid may be adjusted to suspend chains of nanostructures before depositing the chains on a substrate to form a partially-aligned nanostructure film.

Following one or more of Steps 210, 212, and 214 may generate a material composition.

The method may end following Step 214.

FIG. 2C shows a flowchart of a method in accordance with one or more embodiments of the invention. The method depicted in FIG. 2C may be used to obtain a partially-aligned nanostructure film in accordance with one or more embodiments of the invention.

In Step 220, a material composition is deposited on a substrate.

In one or more embodiments of the invention, the deposited material composition includes nanostructures and a component that can be activated. In one or more embodiments of the invention, the fluid is deposited by a syringe. Other mechanical devices may be used to deposit the fluid without departing from the invention.

In Step 222, nanostructures within the deposited material composition are partially-aligned and chained using an electric field before evaporating the fluid of the material composition.

In one or more embodiments of the invention, the electric field is applied using electrodes that induce the electric field to align with a preferred axes. In one or more embodiments of the invention, the preferred axes is coplanar with a surface of a substrate on which the fluid is disposed.

In Step 224, the partially-aligned and chained nanostructures are deposited on the substrate by evaporating the fluid of the deposited material composition.

In one or more embodiments of the invention, the partially-aligned and chained nanostructures are deposited on the substrate by evaporating a portion or component of the fluid of the deposited material composition. For example, in some embodiments of the invention, the fluid may include multiple components. Only one or a portion of one component of the fluid may be evaporated to deposit the partially-aligned and chained nanostructures.

For example, the fluid may include two liquids. A first liquid of the fluid may solubilize or otherwise enable nanostructures to be suspended in the fluid. When a portion or all of the first liquid is evaporated, the nanostructures may crash precipitate out of the fluid due to a low solubility or suspend ability of the nanostructures in the remaining components of the fluid.

The method may end following Step 224.

FIG. 2D shows a flowchart of a method in accordance with one or more embodiments of the invention. The method depicted in FIG. 2D may be used to obtain a joint-modified partially-aligned nanostructure film in accordance with one or more embodiments of the invention.

In Step 230, a suspension agent is removed from a partially-aligned nanostructure film.

In one or more embodiments of the invention, suspension agent is removed by decomposing the suspension agent. In one or more embodiments of the invention, the suspension agent is decomposed by applying heat.

In Step 232, a component in the partially-aligned nanostructure film is activated that modifies the joints of the partially-aligned nanostructure film.

In one or more embodiments of the invention, component is activated by heating the nanostructure film to a temperature less than a melting temperature of the nanostructures. In one or more embodiments of the invention, activating the component releases free silver atoms.

In one or more embodiments of the invention, the component is a metal salt. In one or more embodiments of the invention, the metal salt decomposes by heating the metal salt to a temperature that is less than the melting temperature of the nanostructures.

In one or more embodiments of the invention, component is activated by applying electromagnetic radiation to the nanostructure film. Applying electromagnetic radiation to the film may activate the component. For example, applying electromagnetic radiation may decompose the component. In one or more embodiments of the invention, the electromagnetic radiation has a wavelength of less than 1 mm. In one or more embodiments of the invention, the electromagnetic radiation is infrared radiation, visible light, or ultraviolet radiation. In one or more embodiments of the invention, activating the component releases free metal atoms. In one or more embodiments of the invention, the metal atoms are a noble metal. In one or more embodiments of the invention, the noble metal is silver or gold.

The method may end following Step 232.

The joint-modified partially-aligned nanostructure films manufactured using the methods illustrated in FIGS. 2A-2D may have improved conductivity and/or light transmission when compared to existing partially-transparent conductive films such as, for example, films of indium tin oxide.

In one or more embodiments of the invention, the joint-modified partially-aligned nanostructure films may have an anisotropic conductivity. In other words, the conductivity of the nanostructure film may depend on the direction of electric current within the films. For example, electric currents aligned with the axes to which the nanostructures are partially-aligned may encounter a lower resistance than electric currents not aligned to the axes.

The aforementioned joint-modified partially-aligned nanostructure films may be used in electronic devices such as, for example, liquid crystal display, reflective display, photovoltaic devices, or other electro-optical devices. In one or more embodiments of the invention, the joint-modified partially-aligned nanostructure films may be used as a translucent conductive layer in an electro-optical device.

To further clarify aspects of the invention, examples of material compositions are provided. The following example material compositions are for explanatory purposes only are should not be considered limiting.

Example 1

Silver nanostructures are coated with noble metals such as gold and rhodium. The silver nanostructures are coated by adding Au and/or Rh complex to a solution including the silver nanostructures. The coating can prevent oxidization of the silver nanowires and improve conductivity at joints between nanowires.

To form a gold coating, Chloroauric acid (HAuCl4) or gold sulfite (Au2S) is used in electroless deposition of Au on the silver nanowires. To form a Rhodium coating, Rhodium Chloride (RhCl3) is used in electroless deposition of Rh on silver nanowires.

To perform electroless deposition, silver nanowires are suspended in ethanol or 2-propanol, and introduced to the substrate at the same time as silver nanowires chaining. The electroless deposition is performed while depositing nanowires to induce deposition of metal at the joints between nanowires.

Example 2

Using segmented nanowires including low temperature melting point ends of the segmented nanowires are suspended in a liquid medium. The suspended segmented nanowires are deposited to form chains. After depositing the chains, the chains are heated to a temperature that causes rapid diffusion or melting of the low temperature melting point ends of the segments.

Example 3

A binder and nanostructures are suspended in a liquid medium. The liquid is deposited and evaporated resulting in the formation of a nanowire chain infused with binder. The binder may be a cellulose polymer (e.g., cellulose acetate, hydroxypropyl methyl cellulose) or an unsaturated polymer (e.g., vinyl, vinylidene and Acrylic acid). After deposition, the binder infused nanowire chain is exposed to a stimulus. The stimulus may be heat or optical radiation that causes the binder to activate. When activated, the binder shrinks presses the nanostructures embedded in the nanowire chain against each other.

End of Examples

Embodiments of the invention may provide one or more of the following advantages: (i) improved conductivity of nanostructure films when compared to contemporary partially-transparent conductive films, (ii) improved durability when compared to contemporary partially-transparent conductive films by the use of reinforced joints and elastic metals, (iii) reduced cost when compared to contemporary partially-transparent conductive films due to use of inexpensive wet chemistry, and (iv) improved uniformity of nanostructure dispersion which, in turn, improves the uniformity of the electrical and/or optical properties of the nanostructure films.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A material composition for manufacturing a translucent conductive film, comprising:
   a fluid;
   a plurality of nanostructures disposed in the fluid, wherein the plurality of nanostructures are metal coated dielectric rods; and
   a component that modifies a structure of a joint formed between at least two nanostructures of the plurality of nanostructures after the component is activated.

2. The material composition of claim 1, wherein the plurality of nanostructures comprises a metal having an electrical conductivity greater than 1,000,000 siemens/meter.

3. The material composition of claim 1, wherein each nanostructure of the plurality of nanostructures has a linear shape.

4. The material composition of claim 3, wherein the component comprises:
   a first plurality of linear nanostructures, wherein each linear nanostructure of the first plurality of linear nanostructures is directly attached to a first end of a corresponding nanostructure of the plurality of nanostructures.

5. The material composition of claim 4, wherein the component comprises:
   a second plurality of linear nanostructures, wherein each linear nanostructure of the second plurality of linear nanostructures is directly attached to a second end of a corresponding nanostructure of the plurality of nanostructures.

6. The material composition of claim 1, wherein the component comprises a metallic salt.

7. The material composition of claim 1, wherein the component comprises an organometallic compound having a decomposition temperature that is lower than a melting temperature of a second material, wherein the plurality of nanostructures consists essentially of the second material.

8. The material composition of claim 1, wherein the plurality of nanostructures has an average length to diameter ratio of greater than 1000 to 1.

9. The material composition of claim 1, wherein the plurality of nanostructures has an average diameter of less than 150 nanometers.

10. The material composition of claim 1, wherein the plurality of nanostructures has an average diameter greater than 200 nanometers and less than 500 nanometers.

11. The material composition of claim 1, wherein the plurality of nanostructures has an average diameter of 300 nanometers.

12. The material composition of claim 1, wherein the fluid comprises at least one selected from a group consisting of water and alcohol.

13. A material composition for manufacturing a translucent conductive film, comprising:
   a fluid;
   a plurality of nanostructures disposed in the fluid; and
   a component that modifies a structure of a joint formed between at least two nanostructures of the plurality of nanostructures after the component is activated,
   wherein the component comprises:
      an extension having a spherical shape to respective lengths of the plurality of nanostructures.

14. The material composition of claim 13, wherein the plurality of nanostructures comprises a metal having an electrical conductivity greater than 1,000,000 siemens/meter.

15. The material composition of claim 13 wherein each nanostructure of the plurality of nanostructures has a linear shape.

16. The material composition of claim 13, wherein the fluid comprises at least one selected from a group consisting of water and alcohol.

17. The material composition of claim 13, wherein the plurality of nanostructures are metal coated dielectric rods.

18. The material composition of claim 13, wherein the plurality of nanostructures consists essentially of rod shaped particles.

19. The material composition of claim 18, wherein the rod shaped particles have an average length to diameter ratio of greater than 1000 to 1.

* * * * *